United States Patent [19]
Kohnen

[11] Patent Number: 5,553,730
[45] Date of Patent: Sep. 10, 1996

[54] ELECTRICAL JUNCTION BOX FOR USE IN CURVED STRUCTURES

[76] Inventor: Stephen J. Kohnen, 2160 Pyrenees, Florissant, Mo. 63033

[21] Appl. No.: 316,944

[22] Filed: Oct. 3, 1994

[51] Int. Cl.$^6$ .................................................. H02G 3/08
[52] U.S. Cl. ........................... 220/3.2; 220/3.3; 220/3.5; 220/3.8
[58] Field of Search ............................ 220/3.2, 3.3, 3.4, 220/3.5, 3.6, 3.8; D13/152

[56] References Cited

U.S. PATENT DOCUMENTS

| | | | |
|---|---|---|---|
| D. 52,944 | 2/1919 | Boyton | D13/152 |
| D. 156,681 | 12/1949 | Stone | D13/152 |
| D. 160,441 | 10/1950 | Stone | D13/152 |
| D. 183,593 | 9/1958 | Atkin | D13/152 X |
| D. 185,057 | 5/1959 | Atkin | D13/152 X |
| 416,234 | 12/1889 | Perot . | |
| 1,735,331 | 11/1927 | Merrill | 220/3.6 |
| 1,883,457 | 10/1932 | Arnold . | |
| 2,181,740 | 11/1939 | Reiland | 72/105 |
| 3,083,856 | 4/1963 | Appleton | 220/3.2 |
| 4,176,758 | 12/1979 | Glick | 220/3.3 |
| 4,265,365 | 5/1981 | Boteler | 220/3.3 |
| 4,674,646 | 6/1987 | Teron | 220/3.4 |
| 4,794,207 | 12/1988 | Norberg et al. | 220/3.3 X |
| 5,374,812 | 12/1994 | Chan et al. | 220/3.6 |

FOREIGN PATENT DOCUMENTS

| | | | |
|---|---|---|---|
| 686700 | 1/1953 | United Kingdom | 220/3.2 |
| 1283702 | 8/1972 | United Kingdom | 220/3.2 |

*Primary Examiner*—Sue A. Weaver
*Attorney, Agent, or Firm*—Haverstock, Garrett & Roberts

[57] ABSTRACT

An electrical junction box is specifically designed for mounting within cylindrical concrete piers and other curved structures commonly employed for supporting light poles and other mechanisms wherein the front wall portion of the junction box including the face plate member associated therewith for controlling access to the interior portion of the junction box are both shaped and configured to conform to the specific curvature associated with the outer surface of the curved structure into which the present junction box will be mounted. This construction allows the present junction box to be completely embedded within the curved structure thereby enabling the exposed front wall portion thereof including the face plate member to lie substantially flush with the curved structure's exterior surface. Although a generally truncated cylindrical wedge shape junction box wall configuration is generally preferred for most applications, it is recognized that other wall configurations will likewise work equally as well so long as the front portion of the present junction box is so shaped and curved so as to be compatible with the curvature of the outer surface of the particular curved structure into which it will be encased. The present construction allows more convenient access to the interior portion of the junction box and provides a more weatherproof and tamperproof junction box as compared to the known square or rectangularly shaped junction boxes which are often times used in curved structure applications.

14 Claims, 3 Drawing Sheets

ELECTRICAL JUNCTION BOX FOR USE IN CURVED STRUCTURES

The present invention relates to an electrical junction box which provides protective housing and convenient access to electrical controls and connections embedded within curved structures and, more particularly, to several embodiments of an electrical junction box which is of a generally truncated cylindrical wedge shape so as to be madfly employed in cylindrical concrete piers for light poles and other structures that require electrical wiring and other electrical components to be associated therewith.

BACKGROUND OF THE INVENTION

Electrical junction boxes are generally formed as box-like structures such as the known rectangular and square shaped junction boxes commonly employed in many different applications, such known junction boxes being specifically designed and conveniently adaptable for flush mounting to a planar wall, either interiorly or exteriorly. As such, the known electrical junction boxes are not readily adaptable for attachment to or encasement within curved structures such as cylindrical concrete piers. On those occasions when rectangularly or square shaped junction boxes have been either attached to or encased within concrete piers, unique problems have arisen. For example, in such a situation, square or rectangularly shaped junction boxes must be either specifically recessed within the curved structure so as to avoid any portion thereof from protruding beyond the outer surface of the curved structure thereby making access to and work within the junction box more inconvenient and difficult, or such junction boxes must be permitted to protrude beyond the outer surface of the curved structure into which it is being mounted thereby leaving portions of the junction box vulnerable to damage from weather or other external sources. Such an installation is therefore less weatherproof and tamperproof than generally desired. There, therefore, exists a need to specifically design an electrical junction box which permits ready employment in cylindrical or curved shaped structures such as cylindrical concrete piers commonly used for supporting light poles and other structures.

Various electrical outlet and distribution boxes have been constructed and used in the past for many different types of applications. Typical of such devices are the devices disclosed in U.S. Pat. Nos. 4,674,646; 2,181,740; 1,883,457; and 416,234. Although all of the prior art devices referenced above disclose somewhat different box-like shaped devices, none of these known prior art devices include any type of curvilinear or arcuate shape which would make such devices compatible for ready use in a wide variety of curved structures such as cylindrical concrete piers. None of the known prior art devices disclose or even suggest the construction and operation of an electrical junction box wherein the front facing of such junction box can be mounted flush within a curved structure as disclosed by the present invention. For these and other reasons, the known prior art constructions are materially deficient when it comes to applications involving curved structures.

SUMMARY OF THE INVENTION

The present junction box overcomes many of the disadvantages and shortcomings associated with the known constructions and teaches the construction and operation of several embodiments of an electrical junction box which is specifically designed for use in cylindrical concrete piers and other curved structures. The present junction box is of a generally truncated cylindrical wedge shape and comprises a housing member having a curved front wall portion associated therewith and a curved face plate member attachable to the housing member, the face plate member and the front wall portion of the housing having the same curvature as the curved structure into which the present device is to be mounted. In its preferred embodiment, the housing member includes a concave rear wall, vertically planar side walls extending radially from the rear wall, and horizontally planar top and bottom walls interconnecting the rear and side walls and extending therebetween. The front portion of the housing member is substantially open but does include a front wall portion which extends around the perimeter thereof defining a lip or flange portion for attaching the face plate member thereto. The face plate member preferably includes a gasket type seal on the inner side portion thereof and is adapted to be readily attached by suitable means to the front wall portion of the housing member so as to form a front wall surface concentrically shaped with and spaced from the rear wall which totally closes the cavity or space for,med within the housing member. Also, importantly, apertures can be provided through any of the wall members forming the present junction box including the face plate member for receiving wire leads or other conduit therethrough for attachment purposes.

The present junction box is therefore specifically designed for compatible use with cylindrical concrete piers and other curved structures that specifically require electrical wiring or other electrical controls and connections to be associated therewith to effect a desired result. Enclosure of the present junction box within cylindrical or other curved structures can be easily accomplished by inserting the present junction box into cutouts formed in sonotube forms commonly used to form up such curved structures or piers prior to the pouring of any concrete. Conduit or other electrical wiring or connections can likewise be attached to the junction box, as required, prior to the concrete pouring. Subsequently, after the concrete has been hardened, the sonotube form can be removed, leaving the concrete pier or other curved structure with the present junction box and conduit or other electrical components encased therein.

Although it is preferred that the front and rear wall portions of the present housing member be concentrically spaced from each other so as to define the arcs of two concentric circles, it is recognized and anticipated that the rear and side walls associated with the present housing member may take on a wide variety of other shapes and angular orientations so long as the front portion of the housing and the face plate member are so shaped and curved so as to be compatible with the curvature of the outer surface of the particular curved structure into which the present junction box will be encased. Several embodiments of the present invention illustrating these variations are likewise disclosed and discussed hereinafter. Thus, when the present housing member is embedded and encased within a cylindrical concrete pier or other curved structure and the face plate member is attached thereto in accordance with the teachings of the present invention, the exposed face plate member will lie flush with the curved structure's exterior surface. This arrangement also provides a more weatherproof and tamperproof junction box as compared to the known square or rectangularly shaped junction boxes which have often been used in the past in this particular application.

It is therefore a principal object of the present invention to teach the construction and operation of an electrical junction box which is specifically designed for use with cylindrical concrete piers and other curved structures.

Another object is to teach the construction and operation of an electrical junction box which affords convenient access when mounted within curved structures.

Another object is to provide an electrical junction box which is both tamper-resistant and weatherproof when embedded within a curved structure.

Another object is to teach the construction and operation of an electrical junction box which can be mounted within a curved structure such as a cylindrical concrete pier such that its front wall surface lies substantially flush with the exterior surface of such curved structure.

Another object is to provide an electrical junction box that is less susceptible to accidental damage from external sources when embedded within a curved structure.

Another object is to provide an electrical junction box that can be easily used in conjunction with existing tube-type concrete forms which are commonly employed to form cylindrical concrete piers for light poles and other mechanisms that require electrical wiring and the like to be associated therewith.

These and other objects and advantages of the present invention will become apparent to those skilled in the art after considering the following detailed specification in conjunction with the accompanying drawings.

DETAILED DESCRIPTION OF THE PREFERRED EMBODIMENT

Figure 1:
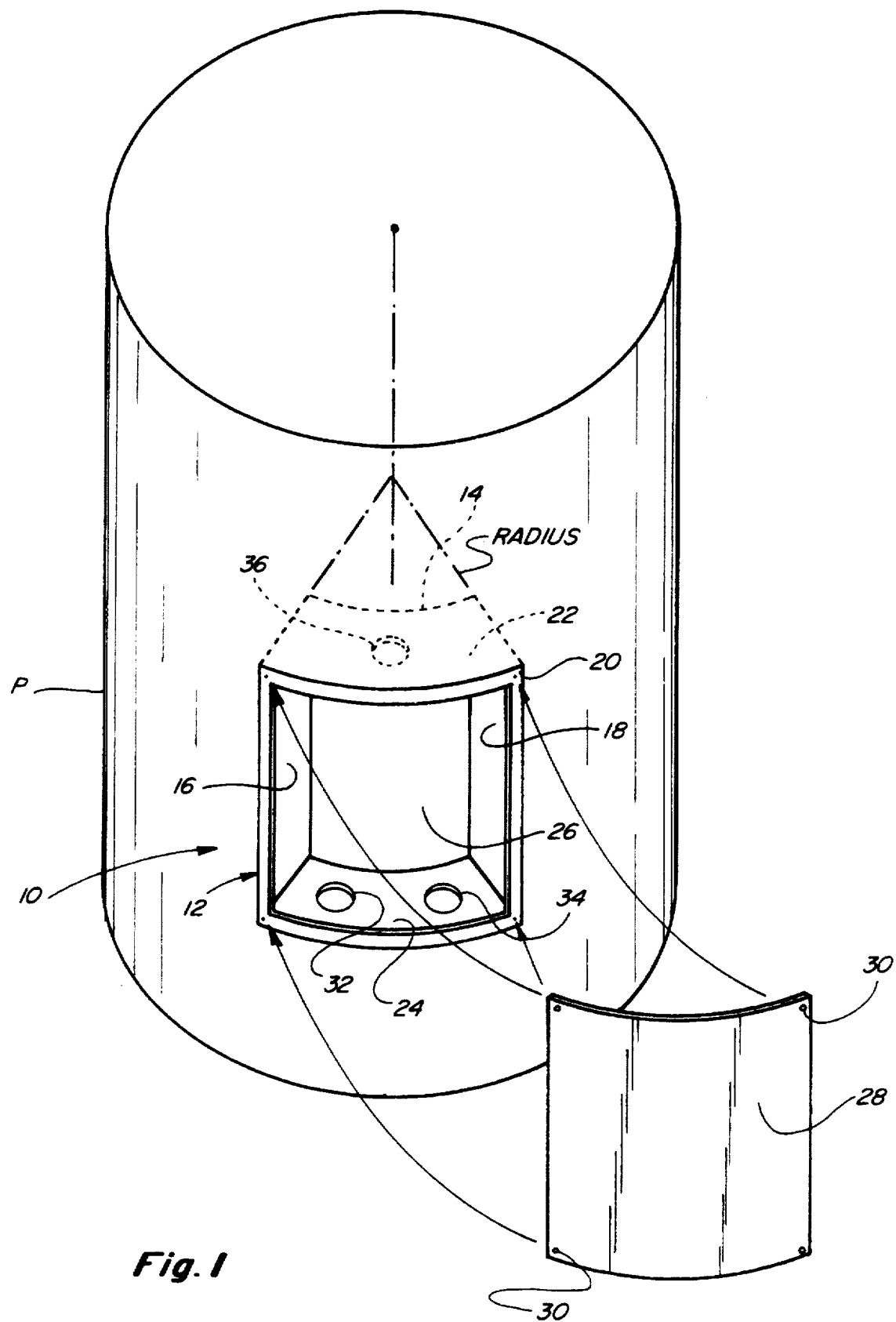
FIG. 1 is an exploded perspective view of a preferred embodiment of the present electrical junction box constructed according to the teachings of the present invention showing the housing member in operative position within a typical cylindrical structure and further showing the present face plate member positioned for cooperative engagement with the front portion of the housing member.
Figure 2:
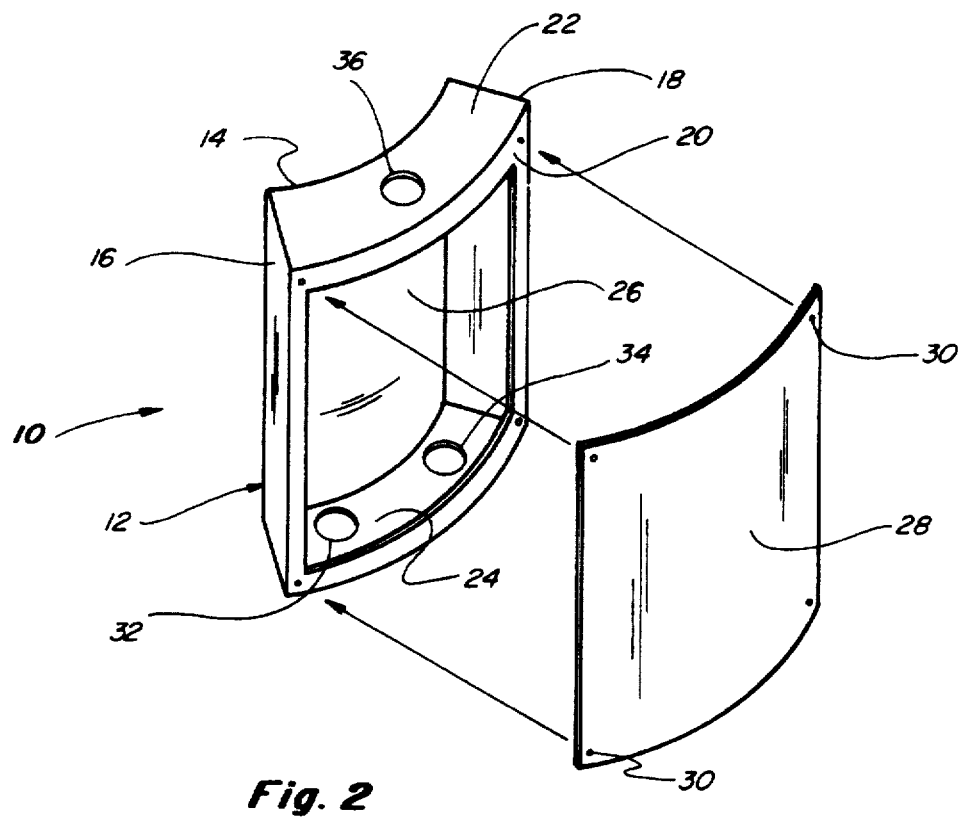
FIG. 2 is another exploded perspective view of the present electrical junction box similar to FIG. 1 without reference to a typical cylindrical structure.

Referring to the drawings more particularly by reference numbers wherein like numerals refer to like parts, number 10 in FIGS. 1 and 2 identifies a preferred embodiment of the present electrical junction box constructed according to the teachings of the present invention. The present junction box 10 is of a generally truncated concavo-convex cylindrical wedge shape and is shown in FIG. 1 installed in a typical cylindrical concrete pier P. The junction box 10 comprises a housing member 12 which includes a curved or concave rear wall portion 14, spaced side wall portions 16 and 18, a front wall lip or flange portion 20, and spaced top and bottom wall portions 22 and 24, the top and bottom wall portions 22 and 24 extending the full length and depth of the housing member 12 between the front, rear and side wall portions thereof as shown in FIGS. 1 and 2. More particularly, the side wall portions 16 and 18 are vertically planar and extend radially along a radius of the cylindrical structure P between the concave rear wall portion 14 and the concentrically spaced front wall lip portion 20 as illustrated in FIG. 1. The lip or flange portion 20 extends peripherally around the front edge portion of the housing member 12 and is specifically formed so as to have a radius of curvature substantially equal to that of the curved structure P into which the housing member 12 will be mounted. The top and bottom wall portions 22 and 24 each include curved front and rear edge portions, these edge portions having a radius of curvature corresponding to the curvature associated with the rear and front wall portions 14 and 20. The front wall portion 20 further provides a mating surface for attachment of the face plate member 28 as will be hereinafter explained.

The housing wall members 14, 16, 18, 20, 22 and 24 define a substantially enclosed space 26 which forms the interior portion of the junction box 10 wherein electrical connections and/or controls can be housed and accessed. This space 26 is easily accessed through the front portion of the housing member 12 as illustrated in FIGS. 1 and 2 and is completely enclosed when the face plate member 28 is attached to the housing member 12.

Figure 7:
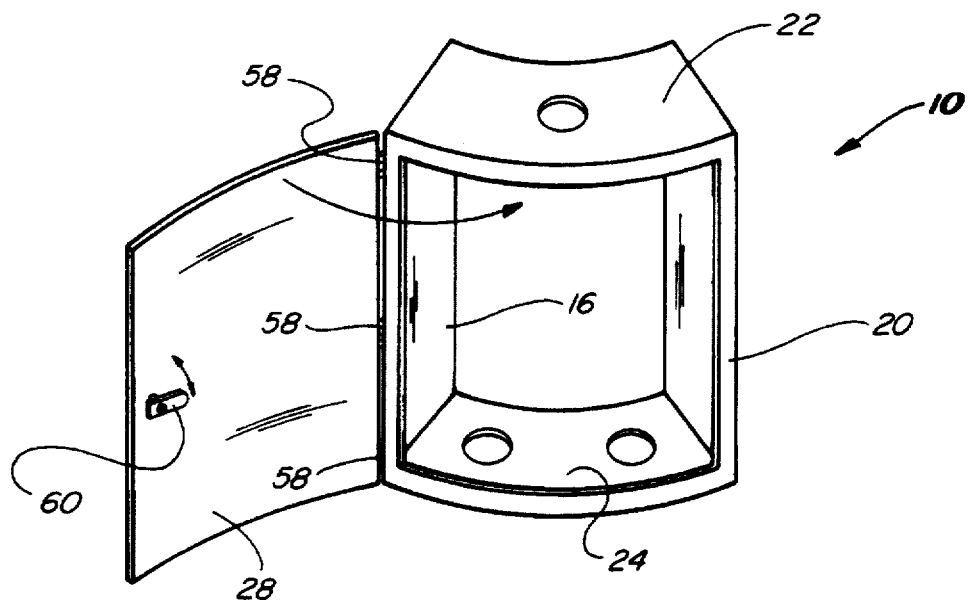
FIG. 7 is a perspective view of the junction box of FIG. 1 showing the present face plate member hingedly attached to the front portion of the housing member.
Figure 8:
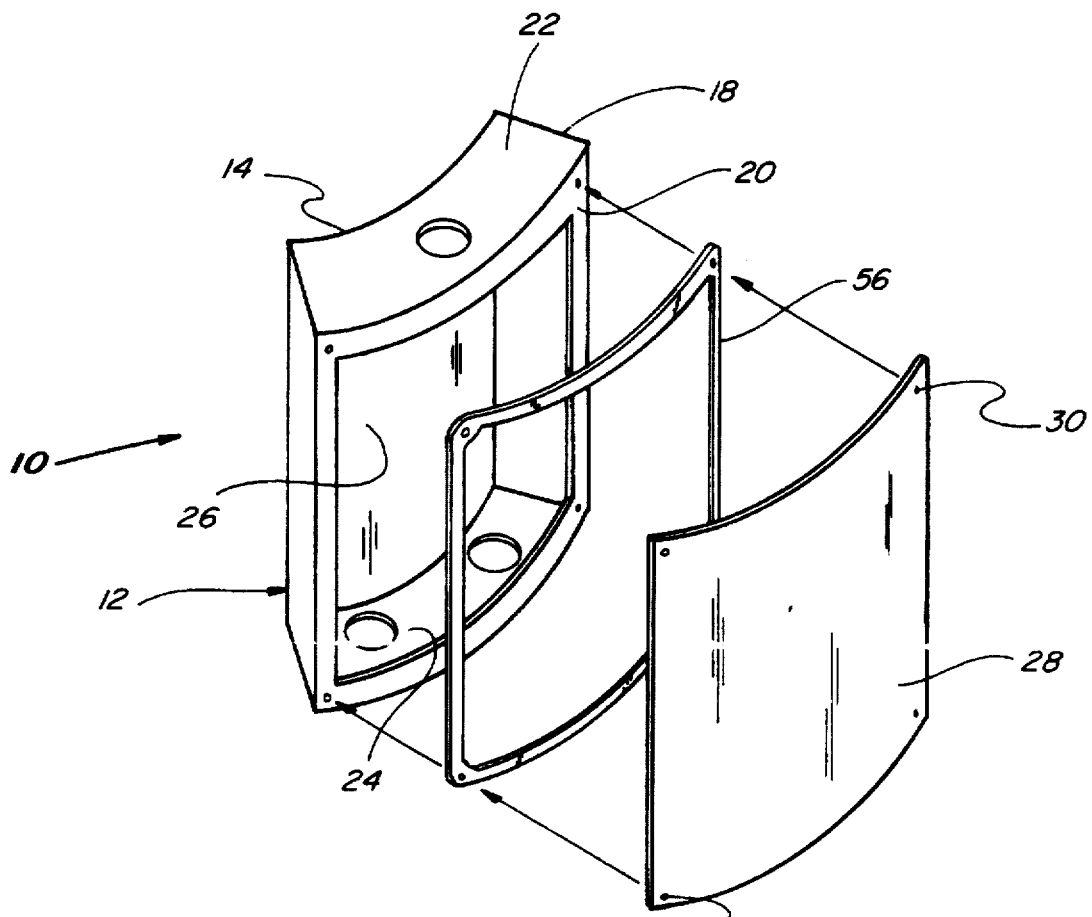
FIG. 8 is an exploded perspective view of the junction box of FIG. 2 showing a gasket type seal member positioned for operative engagement between the face plate member and the front portion of the housing member.

With respect to the housing member 12, it is important to note that the front wall lip portion 20 is convex or otherwise curved or rounded (FIGS. 1 and 2) so as to correspond to the curvature of the outer surface of the curved structure or cylindrical pier P as shown in FIG. 1. Although the shape and curvature of the rear wall portion 14 may vary, as will be hereinafter explained, it is important that the front wall portion 20 of the housing member 12 be curved such that it will be substantially flush with the exterior surface of the curved structure into which it is embedded as illustrated in FIG. 1. Similarly, the face plate member 28 is likewise convex or curved or otherwise rounded to correspond to the radius of curvature associated with the front wall lip portion 20. The face plate member 28 also preferably includes a gasket type seal 56, as shown in FIG. 7, on the inner side portion thereof and is adapted to be attached by any suitable attachment means to the front housing portion 20 such as by the fastener means 30. It is recognized that the face plate member 28 may likewise be hingedly attached to the housing member 12 as shown in FIG. 8 such as adjacent one side portion thereof as at 58 and may likewise include means 60 to securely lock the face plate member when in its closed position. When attached to the front wall portion 20, the gasket seal 56 (not shown in FIG. 7) located on the concave side of the face plate member 28 forms a tight weatherproof seal therebetween thereby further protecting the contents of the junction box 10 from deterioration and other problems associated with exposure to the elements. Likewise, since the junction box 10 is recessed within the curved structure P, it provides greater protection to the contents thereof and greatly decreases its exposure to damage from a wide variety of other external sources, including unwanted tampering.

Conduit, conductors or other components may extend into the electrical junction box 10 through any number of apertures or knockouts that can be located, where desired, on any of the wall portions associated with the housing member 12 such as the apertures 32, 34 and 36 illustrated in FIGS. 1 and 2. These apertures can be provided through any of the wall portions including the side wall portions 16 and 18 for attachment to conduit and/or for receiving wiring leads depending upon the particular application. Any aperture that remains open after conduit, wiring or other components have been installed within the space 26 may be plugged or sealed so that excess concrete or other suitable materials do not leak into the housing member 12 during the casting process.

The present junction box 10 is specifically designed to be cast within a cylindrical concrete pier or other structure and can be easily positioned and located in its proper operative position during the forming process. In this regard, the present junction box 10 can be easily inserted into cutouts in sonotube forms which are typically used for forming a wide variety of different types of concrete piers that are used in a multitude of different applications, such as a base for light poles and other structures. The present junction box 10 is secured within the sonotube form prior to the actual pouring of any concrete. The housing member 12 can be positioned and supported in its desired location using conventional means sufficient to keep the housing member 12 stable and steady during the pouring process. Once the concrete material is cured and set, the housing member 12 will be firmly embedded therewithin as best illustrated in FIG. 1. Conduit and/or wiring can be attached to the junction box 10, as required, prior to the pouring process and such installation would also help prevent the junction box 10 from becoming dislodged from its encasement. Subsequently, the sonotube form can be removed leaving the concrete pier with the junction box 10 and conduit/wiring encased therein. As an additional precaution, means such as tabs, flanges or ridges may be employed on the top, bottom and/or side walls of the housing member 12 to further secure the junction box 10 within the concrete pier and to further prevent such junction box from being moved or otherwise dislodged from its proper position.

Figure 3:
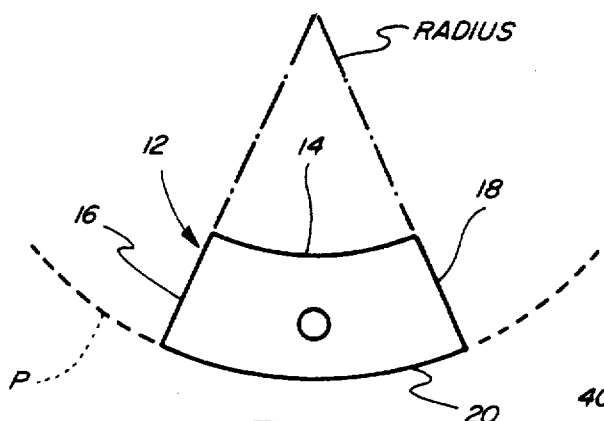
FIG. 3 is a top plan view of the housing member illustrated in FIGS. 1 and 2.
Figure 4:
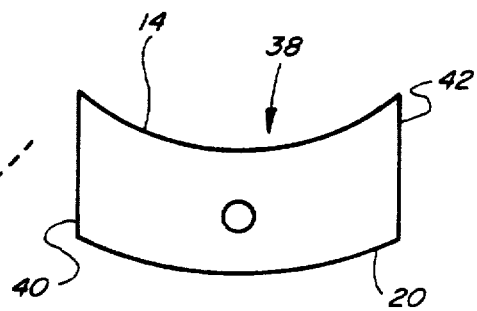
FIG. 4 is top plan view of an another embodiment of the present housing member showing still another housing wall configuration.
Figure 5:
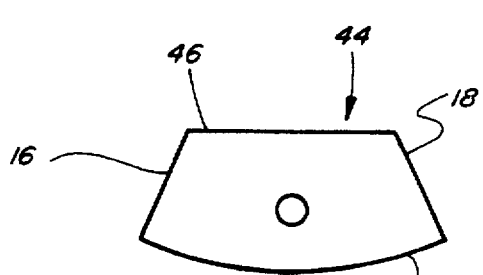
FIG. 5 is a top plan view of still another embodiment of the present housing member showing still another housing wall configuration.
Figure 6:
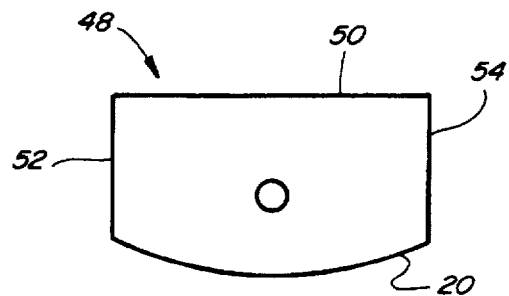
FIG. 6 is a top plan view of a still further embodiment of the present housing member showing a still further housing wall configuration.

Although the shape and configuration of the present housing member 12 illustrated in FIGS. 1 and 2 is generally preferred, it is important to recognize that the particular shape and overall configuration of the rear wall 14 and opposed side walls 16 and 18 are subject to wide variations and may be conveniently fashioned into a variety of other sizes and shapes without impairing the teachings and practice of the present construction so long as the front wall portion 20 or other front edge facing is curved and has a radius of curvature substantially equal to that of the exterior surface of the curved structure or concrete pier into which it will be positioned. For example, the planar side walls 40 and 42 associated with the housing embodiment 38 illustrated in FIG. 4 may extend in a substantially parallel direction relative to each other between the rear and front wall portions 14 and 20, the rear and front wall portions 14 and 20 in embodiment 38 being substantially identical to the rear and front wall portions associated with the housing member 12 illustrated in FIGS. 1, 2 and 3; or the rear wall portion 46 associated with the housing embodiment 44 illustrated in FIG. 5 may be formed by a substantially planar rear wall portion as compared to the curved rear wall 14 associated with the housing member 12 (FIGS. 1, 2 and 3); or both the rear wall portion 50 as well as the opposed side wall portions 52 and 54 associated with the housing embodiment 48 illustrated in FIG. 6 may be shaped and configured in a substantially rectangular pattern as illustrated; or the rear and side wall portions of the housing member 12 may take on still other shapes not illustrated herein which will likewise be compatible for use with the particular installation involved. Irrespective of the particular shape and configuration of the rear and opposed side wall portions associated with the present housing member 12, it is important that the front wall portion 20 as well as the face plate member 28 be curved so as to mount flush or nearly flush with the curved surface of the encasing structure as best illustrated in FIG. 1.

It is therefore recognized and anticipated that the present electrical junction box 10 may be used in many different types of curved structures including curved structures fabricated from a wide variety of materials other than concrete. It is also anticipated and recognized that the housing member 12 may be formed from a single sheet of material pressed into the desired shape thereby further increasing its strength and durability as well as further increasing the weatherproof and tamperproof capabilities of the present device. Still further, it is also important to note that the overall dimensions of the present junction box 10 including the face plate member 28 as well as the particular configuration of the rear and side walls 14, 16 and 18 associated therewith are subject to wide variations, as previously explained. Although the present junction box 10 has particular utility and is readily employable in cylindrical concrete piers, it can likewise be utilized in a multitude of different applications, including use in a wide variety of other curved structures.

Thus, there has been shown and described a novel electrical junction box which can be readily employed in curved structures, which electrical junction box fulfills all of the objects and advantages sought therefor. Many changes, modifications, variations and other uses and applications of the present construction will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An electrical junction box adaptable for mounting within a curved structure comprising a housing member having a rear wall portion, opposed side wall portions, a front wall portion, and opposed top and bottom wall portions extending respectively therebetween, the front wall portion of said housing member being substantially open and providing access to the space formed by and between the wall portions forming said housing member, the front wall portion of said housing member being curved so as to conform to the curvature of the outer surface of the curved structure into which said housing member will be mounted, a face plate member attachable to the front wall portion of said housing member for controlling access to the space formed in said housing member, said face plate member being similarly curved so as to conform to the curvature of the front wall portion of said housing member, and means for attaching said face plate member to the front wall portion of said housing member.

2. The electrical junction box defined in claim 1 wherein the rear wall portion of said housing member is substantially planar.

3. The electrical junction box defined in claim 1 wherein the rear wall portion of said housing member is curved.

4. The electrical junction box defined in claim 3 wherein the rear and from wall portions of said housing member are concentrically spaced from each other and lie along arcs of two concentric circles.

5. The electrical junction box defined in claim 1 including any number of apertures formed through any one or more of the wall portions forming said housing member.

6. The electrical junction box defined in claim 1 wherein said face plate member includes a gasket type seal positioned and located on one surface thereof to seal the opening in the front wall portion of said housing member when said face plate member is attached thereto.

7. The electrical junction box defined in claim 1 wherein opposed side wall portions of said housing member are vertically planar and extend between the rear wall and front wall portions of said housing member in a direction substantially parallel to each other.

8. The electrical junction box defined in claim 1 wherein the opposed side wall portions of said housing member are vertically planar and extend in directions which are angularly oriented relative to each other.

9. The electrical junction box defined in claim 1 wherein said means for attaching said face plate member to said housing member includes pivotal means hingedly attaching said face plate member to the front wall portion of said housing member.

10. An electrical junction box adaptable for mounting within a cylindrical concrete pier and other cylindrical structures comprising a housing member and a face plate member, said housing member being of a generally truncated cylindrical wedge shape and including a concave rear wall portion, a convex front wall portion, opposed side wall portions, and opposed top and bottom wall portions, said wall portions forming said housing member defining an interior space therebetween, said front wall portion having an opening to provide access to the interior space of the housing member, said opposed side wall portions being substantially vertically planar and each extending radially along a radius of the cylindrical structure into which said junction box will be mounted between said rear and front wall portions, said opposed top and bottom wall portions extending the full length and depth of said housing member between the front, rear and side wall portions thereof, said face plate member being attachable to the front wall portion of said housing member for controlling access to said interior housing space, the curvature associated with the front wall portion of said housing member and said face plate member corresponding substantially to the curvature of the outer surface of the cylindrical structure into which said junction box will be mounted, said front and rear housing wall portions being concentrically spaced from each other and defining the arcs of two concentric circles, and means for attaching said face plate member to the from wall portion of said housing member.

11. The electrical junction box defined in claim 10 including at least one aperture formed through each of the opposed top and bottom wall portions of said housing member.

12. The electrical junction box defined in claim 10 wherein said face plate member includes a gasket type seal positioned and located for engaging at least a portion of the front wall portion of said housing member when said face plate member is attached thereto.

13. An electrical junction box comprising a housing member having from, rear, top, bottom and opposed side wall portions defining a space therebetween, the from wall portion of said housing member being substantially open, the front and rear wall portions of said housing member defining arcs of two concentric circles, the opposed side wall portions of said housing member each extending along a radius of the concentric arc defined by the front wall portion of said housing member, and a face plate member attachable to the front wall portion of said housing member for controlling access to said housing space, said face plate member defining substantially the same arc as defined by the from wall portion of said housing member, and means for attaching said face plate member to the from wall portion of said housing member.

14. An electrical junction box for use in curved structures comprising a housing member formed by wall portions which define a substantially enclosed space therebetween, one of the wall portions forming said housing member having an access opening associated therewith for allowing access to said housing space, said one wall portion being curved conformably to the exterior surface of the curved structure into which said junction box will be used, said one wall portion lying substantially flush with the exterior surface of the curved structure when embedded therewithin, closure means for controlling access to said housing space, said closure means being shaped to likewise conform to the shape of the exterior surface of the curved structure, and means for attaching said closure means to said one wall portion.

* * * * *

UNITED STATES PATENT AND TRADEMARK OFFICE
CERTIFICATE OF CORRECTION

PATENT NO. : 5,553,730
DATED : September 10, 1996
INVENTOR(S) : Stephen J. Kohnen It is certified that error appears in the above-indentified patent and that said Letters Patent is hereby corrected as shown below:

Column 1, Line 9, "madfly" should be -- readily --;

Column 2, Line 21, "for, med" should be -- formed --;

Column 6, Line 65, "from" should be -- front --;

Column 7, Line 20, after "means" insert -- for --;

Column 8, Line 4, "from" should be --front --;

Column 8, Line 15, "from" should be -- front --;

Column 8, Line 16, "from" should be -- front --;

Column 8, Line 25, "from" should be -- front --; and,

Column 8, Line 27, "from" should be -- front --.

Signed and Sealed this

Tenth Day of December, 1996

Attest:

BRUCE LEHMAN

*Attesting Officer*  *Commissioner of Patents and Trademarks*